(12) United States Patent
Takayama et al.

(10) Patent No.: US 6,187,229 B1
(45) Date of Patent: *Feb. 13, 2001

(54) PROCESS FOR INJECTION MOLDING INFORMATION RECORDING DISKS

(75) Inventors: Kazutoshi Takayama; Kiyoto Takizawa, both of Hanishina-gun (JP)

(73) Assignee: Nissei Plastic Industrial Co., Ltd., Nagano-ken (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/100,648

(22) Filed: Jun. 19, 1998

Related U.S. Application Data

(63) Continuation-in-part of application No. 08/745,677, filed on Nov. 8, 1996, now abandoned, and a continuation-in-part of application No. 08/745,883, filed on Nov. 8, 1996, now abandoned.

(30) Foreign Application Priority Data

| Nov. 10, 1995 | (JP) | 7-315855 |
| Nov. 10, 1995 | (JP) | 7-315856 |
| Nov. 10, 1995 | (JP) | 7-315857 |

(51) Int. Cl.$^7$ .............. B29C 45/54; B29C 45/63
(52) U.S. Cl. .......... 264/1.33; 264/101; 264/328.17; 264/328.19; 425/203; 425/207; 425/587
(58) Field of Search .............. 264/1.33, 328.1, 264/328.17, 349, 297.2, 102, 328.19, 101; 425/203, 587, 207, 208, 546, 578; 366/75, 101

(56) References Cited

U.S. PATENT DOCUMENTS

| 3,888,393 | * | 6/1975 | Drori | 425/207 |
| 4,074,362 | | 2/1978 | Kruder et al. | 425/203 |
| 4,314,765 | | 2/1982 | Hotz | 425/203 |

(List continued on next page.)

FOREIGN PATENT DOCUMENTS

| 41-25102 | 12/1966 | (JP) . |
| 48-13451 | 2/1973 | (JP) . |

(List continued on next page.)

OTHER PUBLICATIONS

Rosato et al., *Injection Molding Handbook,* pp. 403–405 and 588–591.

* cited by examiner

*Primary Examiner*—Jill L. Heitbrink
(74) *Attorney, Agent, or Firm*—Weingarten, Schurgin, Gagnebin & Hayes LLP

(57) ABSTRACT

An injection molding process wherein the times of heating to melt a resin are reduced to minimize the thermal hysteresis and to decrease the deterioration of physical properties caused by the thermal hysteresis, so that high quality information recording disks may be produced. A molding process wherein the plasticating and the injection and filling of a material resin are carried out in separate cylinders, allows constant molding for a long period of time. A material resin such as polycarbonate is supplied without predrying to an injection apparatus for a first time molding. Resin is kneaded by the apparatus while volatile components are heated to be vaporized and exhausted through a vent port. An inert gas atmosphere is provided within the cylinder to prevent the material resin from being oxidized. Since predrying can be dispensed with, the thermal hysteresis will be extremely small and the deterioration of the resin caused by such heating may be suppressed. Also, there is less chance of generation of carbonized black spots caused by foreign matter, molding failures caused by hydrolysis may be eliminated, and residual monomers can be vaporized and exhausted concomitantly.

21 Claims, 3 Drawing Sheets

U.S. PATENT DOCUMENTS

Figure 1:
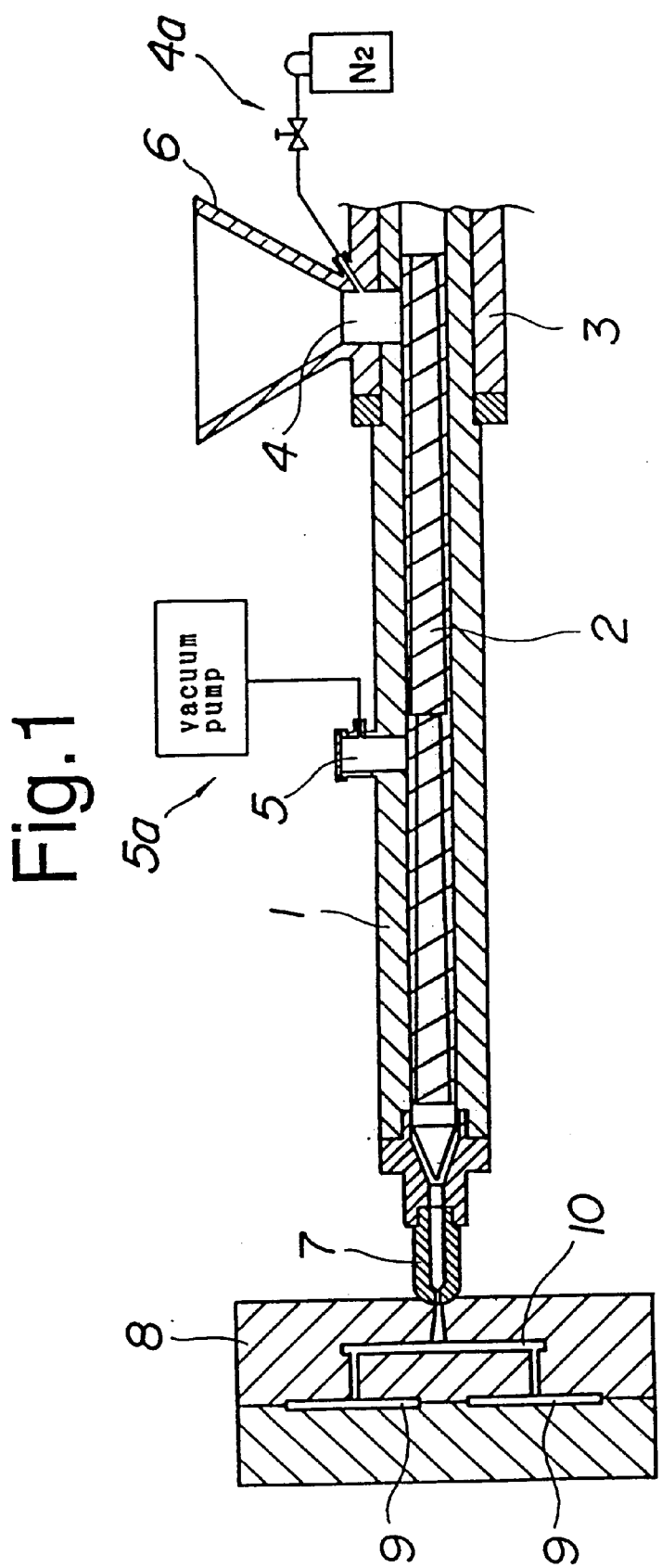

| | | | |
|---|---|---|---|
| 4,908,169 | 3/1990 | Galic et al. | 264/349 |
| 5,073,313 | 12/1991 | Umemura et al. | 264/1.1 |
| 5,116,547 | 5/1992 | Tsukahara et al. | 264/328.18 |
| 5,156,860 | 10/1992 | Kojima et al. | 264/1.1 |
| 5,382,462 | 1/1995 | Kodama et al. | 425/203 |
| 5,385,462 | 1/1995 | Kodama et al. | 425/203 |
| 5,534,204 | 7/1996 | Aoki et al. | 425/203 |
| 5,556,581 | 9/1996 | Aoki et al. | 264/40.1 |
| 5,560,708 | 10/1996 | Takizawa et al. | 425/203 |
| 5,597,525 | 1/1997 | Koda et al. | 425/203 |
| 6,030,203 * | 2/2000 | Kuroda | 425/561 |

FOREIGN PATENT DOCUMENTS

| | | |
|---|---|---|
| 48-73458 | 10/1973 | (JP) . |
| 61-95914 | 5/1986 | (JP) . |
| 62-127218 | 6/1987 | (JP) . |
| 63-57213 | 11/1988 | (JP) . |
| 133329 | 7/1989 | (JP) . |
| 334820 | 2/1991 | (JP) . |
| 334821 | 2/1991 | (JP) . |
| 3216321 | 9/1991 | (JP) . |
| 4173312 | 6/1992 | (JP) . |
| 5261783 | 10/1993 | (JP) . |
| 6293021 | 10/1994 | (JP) . |
| 6315959 | 11/1994 | (JP) . |
| 61902352 | 12/1994 | (JP) . |
| 72364 | 1/1995 | (JP) . |
| 7227889 | 8/1995 | (JP) . |
| 8229997 | 9/1996 | (JP) . |

PROCESS FOR INJECTION MOLDING INFORMATION RECORDING DISKS

CROSS REFERENCE TO RELATED APPLICATIONS

This application is a continuation in part of U.S. application Ser. No. 08/745,677, filed Nov. 8, 1996, entitled PROCESS FOR INJECTION MOLDING INFORMATION RECORDING DISKS, which claims priority to Japanese application No. 7-315855, filed Nov. 10, 1995, and Japanese application No. 7-315857, filed Nov. 10, 1995 now abandoned; and a continuation in part of U.S. application Ser. No. 08/745,883, filed Nov. 8, 1996, entitled: PROCESS FOR INJECTION MOLDING, which claims priority to Japanese application No. 7-315856, filed Nov. 10, 1995, all incorporated herein by reference now abandoned.

STATEMENT REGARDING FEDERALLY SPONSORED RESEARCH OR DEVELOPMENT

N/A

BACKGROUND OF THE INVENTION

The present invention relates to a process for injection molding information recording disks wherein the predrying of a material resin is dispensed with. It also relates to a process for injection molding thin information recording disks wherein the plasticating of a material resin and the injection and filling thereof into a mold are separately accomplished.

Injection molding of information recording disks, such as optical disks, magnetic disks, magneto-optical disks, or the like has conventionally utilized an in-line screw type injection molding apparatus, which is equipped with an injection screw rotatable and movable back and forth in a heating cylinder having a nozzle at the front end and a feed port at the rear.

Traditionally, less expensive, unpelletized resins can hardly be used as feedstock for the injection molding. The unpellitized resins might thus be pelletized into pellets of a predetermined size for use as feedstock for the injection molding. Forming the pellets from resins is called pelletization and is carried out by means of an extruder with a vent. The extruder has a heating cylinder to melt the resin. The molten resin is extruded into strand and the strand is then cut into a predetermined length.

Since a resin to be used for such injection molding is of small-grained, granulated sugar type and contains unreacted monomers, there arises a problem in molding such a resin. The resin is therefore melted by heating and is processed into pellets of a certain grain size before being used as a material resin. Since this resin as prepared into the pellets is hygroscopic, it must be predried to remove moisture before being used for molding. Conventionally, the molding material has a water content of from 0.005% to 0.01% by the steps of pelletizing process and preliminary drying process. These predrying steps must be carried out in the prior art, or the physical properties of the molded article are degraded due to hydrolysis. However, the moisture which may remain in the material resin can not only be the cause of molding failures such as silver streaking or yellowing, but as well result in the hydrolysis of the resin when being plasticated to cause a decrease in the strength of the molded disks. Also, an ill-managed dryer may allow fine foreign matters in the air to be absorbed, and such matters can be, for example, carbonized and surface as black spots on the molded articles, thereby rendering the articles defective. When the molded articles are information recording disks, such as optical disks, magnetic disks, magneto-optical disks, or the like in particular, extremely small and few black spots would cause disorders in their reading.

In addition, in a typical prior art molding process, the material resin, as such, will be subjected to at least three times of heating including pelletization, predrying, and injection molding. This extended heat history can easily cause a deterioration in physical properties, especially in strength. Transparency may also be impaired.

Further, when a conventional in-line screw type injection apparatus is utilized, a material resin fed into a cylinder through a feed port located at the rear of the cylinder is melted and kneaded, that is, plasticated, by the revolutions of an injection screw, the screw being moved backward by the pressure of the resin. As such, the resin will be metered within the front portion of the cylinder, and the metered material will be injected and filled by the advancement of the screw into a cavity of a mold to which a nozzle tip abuts to produce the desired information recording disks. For the purpose of improving transferability and birefringence in thin disks (approximately 1.2 mm in thickness) as well, compression molding which compresses a resin injected and filled into a mold is sometimes practiced.

In such molding in which the plasticating of a resin and the injection and filling thereof are carried out by a single screw, however, since the metering is accomplished by moving an injection screw backward by means of the pressure of the plasticated resin, dispersion in the metering will tend to show as uneven areas despite the use of a small injection apparatus for molding disks or the like which involves small amounts of resin. It will result in an inconstant amount of injection and filling into a cavity, possibly producing accidental no-filling or overfilling and will prevent constant molding for a long period of time.

In addition, unevenness of temperatures will occur throughout the plasticated resin. Moreover, an L/D ratio will change due to the backward movement of the injection screw, giving a tendency that the resin temperature at the completion of metering is lower than that at the beginning. Solutions to these problems include the adoption of a screw with mixing means or a spiral barrier type screw, etc.; however, the effects of such solutions have so far been insufficient and improvements are desired.

BRIEF SUMMARY OF THE INVENTION

In the light of the foregoing, it is one object of the present invention to provide a novel injection molding process wherein the times of heating to melt a resin are reduced to minimize the thermal hysteresis or to decrease the deterioration of physical properties caused by the thermal hysteresis, so that high quality information recording disks may be produced.

It is another object of the present invention to provide a novel injection molding process wherein the plasticating and the injection and filling of a material resin are carried out in separate cylinders, so that constant molding can be provided for a long period of time even for disk molding involving a small amount of resin.

According to a first aspect of the present invention, a material resin such as polycarbonate is supplied, predrying being dispensed with, to an injection apparatus having a vent port; the material resin is melted for a first time since polymerization and kneaded by the apparatus while volatile components such as water contained in the resin are heated to be vaporized and exhausted through the vent port out a cylinder; the melted resin is metered; and the resin is injected and filled into a mold having therein a cavity for molding information recording disks to produce thin information recording disks.

According to a second aspect of the present invention, the injection apparatus is a screw preplasticating injection apparatus so as to produce thin information recording disks. A material resin is melted and kneaded by a plasticating screw within a plasticating cylinder having a vent port while volatile components contained in the resin are exhausted through the vent port out the cylinder; the melted resin is forcibly fed toward and metered against the front portion of an injection cylinder having a plunger inserted therethrough; and the metered resin is injected and filled by the plunger into a mold having therein a cavity for molding information recording disks to produce thin information recording disks.

According to yet a third aspect of the present invention, an inert gas atmosphere is provided within the cylinder between the material feed port and the vent port of the injection apparatus, the inert gas preventing the material resin from being oxidized during the melting and kneading. According to a further aspect of the present invention, a plurality of information recording disks are produced simultaneously by a mold having a plurality of cavities therein.

According to the process of the present invention, since predrying by heating preceding molding can be dispensed with, the thermal hysteresis of a resin will be extremely small and the deterioration, especially the decrease in strength, of the resin caused by such heating may be suppressed. Moreover, since it allows less chance of any foreign matters entering and mixing, the generation of carbonized black spots caused by such matters, which has long been a problem in the art, will be solved.

In addition, molding failures caused by hydrolysis may be eliminated so that high quality information recording disks are obtained. Also, since residual monomers can be vaporized and exhausted concomitantly, the amount of mold deposits adhered on a stamper tensely provided in a mold cavity is reduced, thereby the interval of maintenance action being prolonged. Moreover, when the material resin is plasticated in the inert gas atmosphere, the yellowing of the resin caused by oxidization will be avoided and the thermal hysteresis will lessen, with a result that light transmission through a disk is increased and, especially for polycarbonate, transparency is fully exhibited so that high quality products may be obtained.

According to the molding process of the present invention, a preplasticating injection apparatus equipped with a vent port may also be implemented. When such a preplasticating injection apparatus is used, a material resin is melted and kneaded, that is, plasticated, by a plasticating cylinder having a vent port, which is separately provided from an injection cylinder and rotates at a generally fixed position, while the resin is moved a predetermined distance. As such, the resin having reached the front end of the cylinder shows less dispersion in temperature than when the resin is plasticated in the injection cylinder. Therefore, the temperatures throughout the resin metered into the front portion of the injection cylinder through a resin passage having heating means around it will be uniform, with a result that an extremely thin (0.6 mm) injection molded disk has no residual stress, so that birefringence is improved and a uniform transfer of pits is accomplished as well.

In addition, since the metering is made by moving the plunger backward by the pressure of the resin which is forcibly fed from the plasticating cylinder side, dispersion in the metering will be eliminated and accidental no-filling or overfilling which may be caused by inconstant metering will be avoided. As a result, the dispersion in weight will advantageously decrease from ±0.1 g down to ±0.02 g, and the transferability will also improve so that constant molding may be possible for a long period of time.

DETAILED DESCRIPTION OF THE OF THE DRAWING

Figure 2:
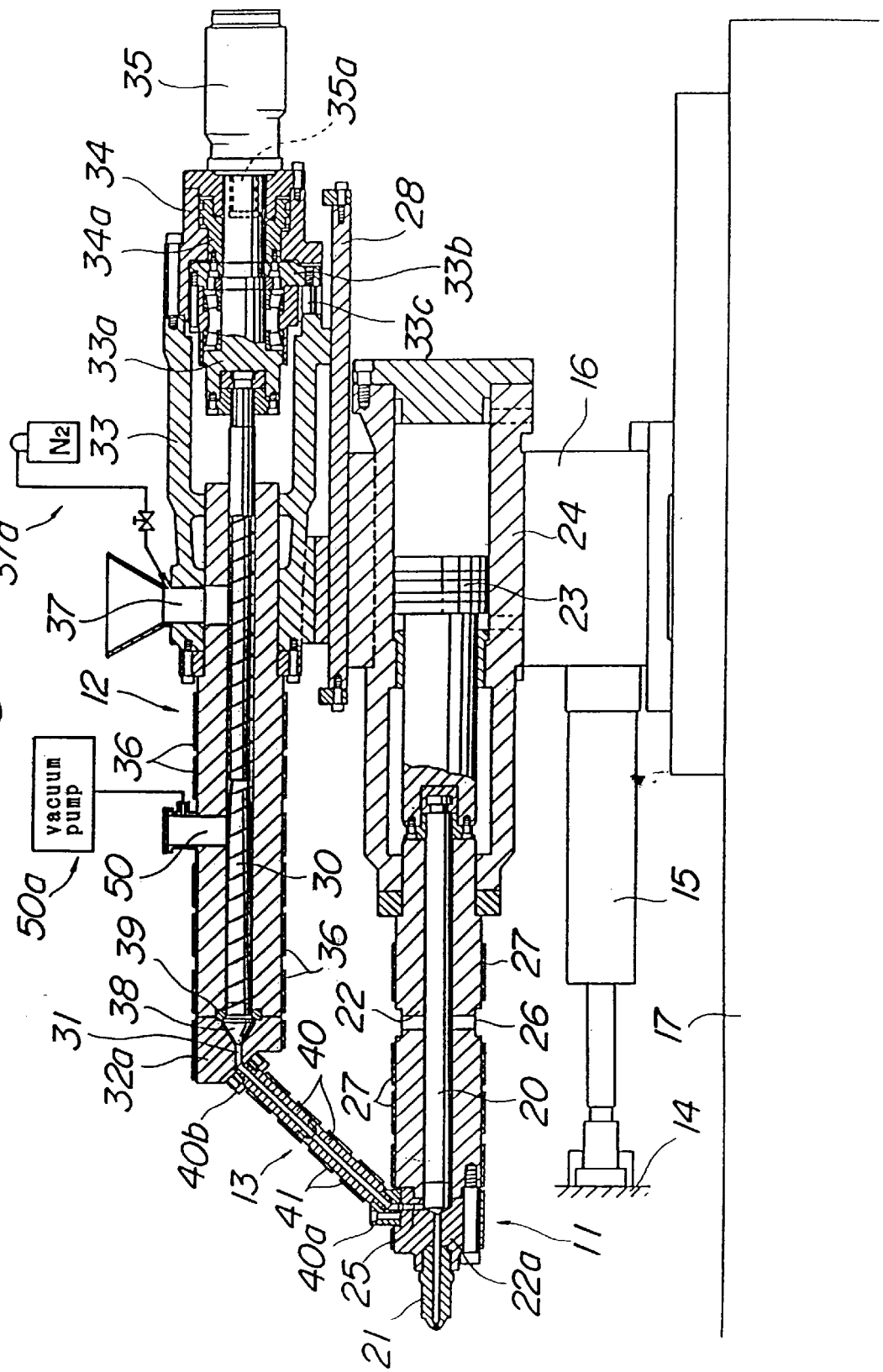
Figure 3:
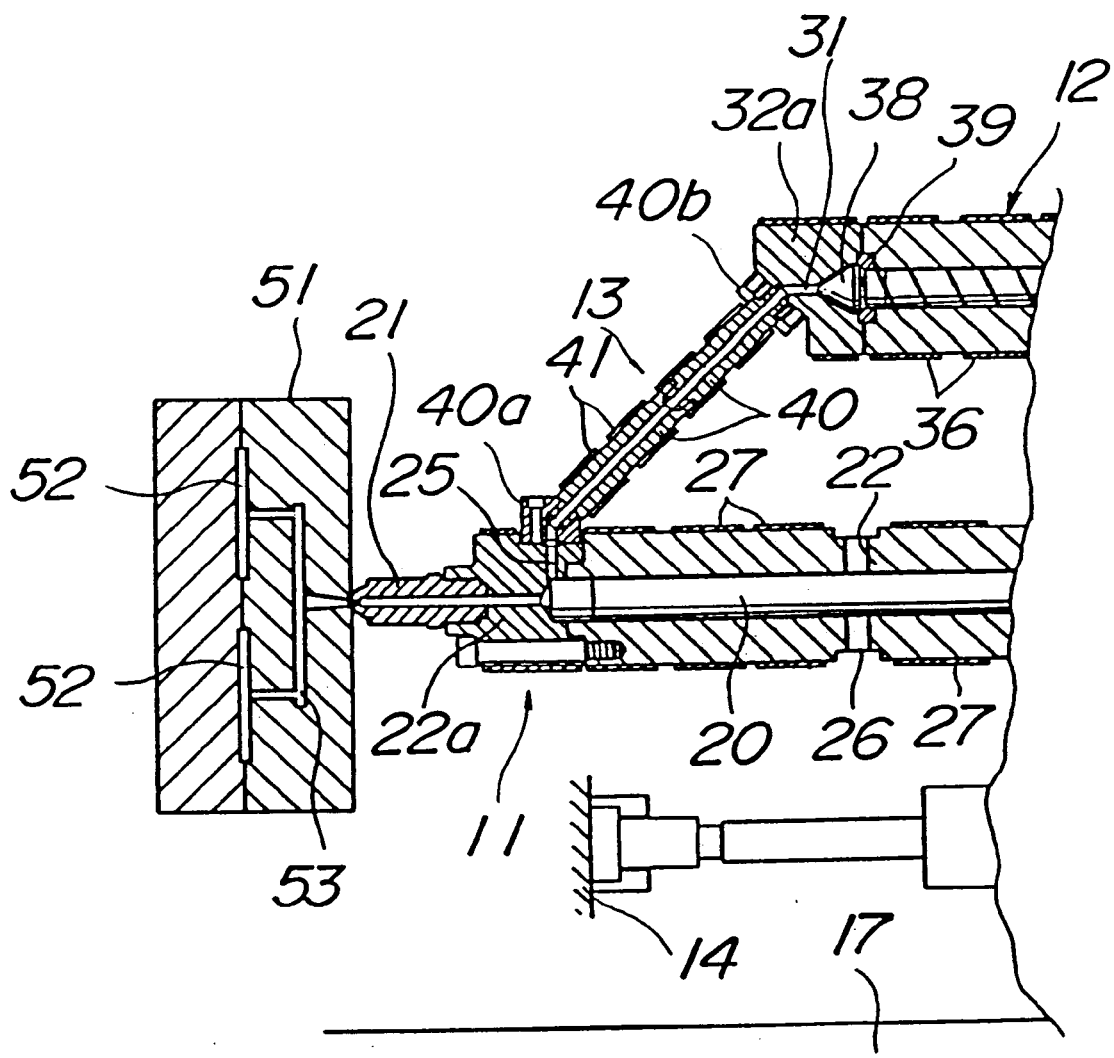

FIG. 1 is a longitudinal sectional view of the principal part of a vent type, internal screw equipped, injection molding apparatus utilized for the information recording disk injection molding apparatus utilized for the information recording disk injection molding process according to the present invention; and FIG. 2 is a longitudinal sectional view of a preplasticating injection molding apparatus utilized for the information recording disk injection molding process according to the present invention; and FIG. 3 is a partial longitudinal sectional view illustrating the relationship between the preplasticating injection molding apparatus and a mold.

DETAILED DESCRIPTION OF THE INVENTION

FIG. 1 illustrates a vent type injection molding apparatus by which the injection molding process according to the present invention may be implemented. A heating cylinder 1 has band heaters, not shown, mounted around its outer surface. The heating cylinder 1 has an injection screw 2 inserted therethrough in such a manner that it is rotatable and movable back and forth. The rear end of the cylinder is mated with a retaining cylinder 3 and is provided with a feed port 4 which is upwardly open.

A vent port 5 is provided through the upper portion of the cylinder forwardly in relation to the feed port 4. The vent port 5 and the feed port 4 are connected respectively to a vacuum suction unit 5a and an inert gas force feed unit 4a.

In such a vent type injection molding apparatus, the injection screw 2 is rotated in a conventional manner, while an inert gas such as nitrogen gas is forcibly fed through the feed port 4 into the cylinder. A vacuum is applied inside the cylinder through the vent port 5.

As such, an undried material resin, for example, polycarbonate, which has been fed in advance into a hopper 6, will be fed through the feed port 4 into the cylinder. As the feedstock is of a free-flowing granular composition, no external feed screw is required in the hopper. Typically, granules having a particle size of 0.5 mm or less provide smooth feeding and consistent melting. The unpelletized, unextruded material resin will then be fed forward within the cylinder and compressed by the revolutions of the injection screw 2.

In course of compression, the material resin will be kneaded while being melted by the heat transferred from the heating cylinder 1 and by the heat generated by the revolutions of the screw. Since such melting and kneading are accomplished in the inert gas atmosphere provided within the cylinder between the feed port 4 and the vent port 5, oxidization by heating may be avoided. In addition, volatile components such as water will be vaporized by the heating and compression and be freed within the cylinder. In accordance with the present inventor, feedstock with a water content between 0.1% up to saturated water content can be provided.

These gases will be sucked through the vent port 5 which is normally under vacuum along with the inert gas and be exhausted out the cylinder, not remaining in the plasticated resin located forwardly in relation to the vent port 5. Consequently, if a resin containing moisture was used, neither yellowing due to oxidization nor deterioration due to hydrolysis would occur in the resin metered in the cylinder against the front part thereof by the backward movement of the screw 2 caused by the pressure of the resin.

The metered resin will be filled by the advancement of the injection screw 2 from a nozzle 7 located at the front end of the cylinder via a hot runner 10 into a cavity 9 within a mold 8. The cavity 9 is used for a thin information recording disk, and includes a stamper which is tensely provided on one side thereof. Thus, a disk to be molded in the mold will have, transferred onto one side thereof, pits which have been formed on the stamper and will be formed into a thin (approximately 0.6 to 1.2 mm) information recording disk made of polycarbonate.

As described above, no inconveniences would exist in injection molding if a resin to be used for such molding was an undried one. This resin per se is preferable in terms of physical properties because it exhibits less thermal hysteresis than a predried material resin does. Since transparency is not impaired for polycarbonate, it is feasible to injection mold high quality optical disks, magneto-optical disks, or the like which have improved birefringence as compared with conventional products. Such information recording disks as produced by the present embodiment exhibit superior light refracting and magnetic properties. Such disks, when subsequently treated for optical or magnetic recordation allow for anisotropic surface characteristics ideal for digital information storage. It also allows a reduction in molding costs because the predrying may be dispensed with.

A preplasticating injection apparatus which can implement another aspect of the present invention will now be described with reference to FIG. 2. An injection apparatus 11 has a plasticating apparatus 12 installed thereabove in parallel relationship thereto, the apparatuses communicating with each other by a resin passage 13 provided across their front ends.

The injection apparatus 11 comprises an injection cylinder 22 having an injection plunger 20 inserted therethrough in such a manner that it is movable back and forth and a nozzle 21 located at the front end, and an injecting hydraulic cylinder 24 contiguously provided to the rear end of the injection cylinder 22 in which a piston 23 is linked to the plunger 20.

The injection cylinder 22 has an inflow passage 25 from the resin passage 13 located in the upper portion at the front end corresponding to the advancement limit of the plunger. The inflow passage 25 is inclined toward the inner peripheral rim 22a of the injection cylinder 22 so that the plasticated resin fed through the resin passage 13 may flow along the inner peripheral surface.

Upper and lower resin extraction holes 26 are provided on the injection cylinder 22 rearwardly in relation to the plunger stroke of the injection cylinder 22. Band heaters 27 are disposed around the cylinder up to a point rearward in relation to the resin extraction holes 26 to provide a longer heater zone.

The plasticating apparatus 12 comprises a plasticating cylinder 32 having a plasticating screw 30 inserted therethrough in a rotatable manner and an outflow passage 31 located at the front end, a retaining cylinder 33 located at the rear end for retaining the plasticating cylinder 32, a hydraulic cylinder 34 linked to the rear end of the retaining cylinder 33 for moving a screw back and forth and a revolution drive unit 35 for moving a screw 30 attached to the rear end of the hydraulic cylinder 34.

The drive shaft 35a of the revolution drive unit 35 is linked to a rotation axis 33a which has its rear end inserted through the piston 34a of the hydraulic cylinder 34 and is received within the retaining cylinder 33 in such a way that it is axially movable. Linked to the front end of the rotation axis 33a is the rear end of the screw 30. The rotation axis 33a is also linked via a member 33b with the piston 34a in such a manner that it can only move in the axial direction, and moves back and forth together with the piston 34a so as to move the screw 30 also back and forth. The member 33b is provided with a stop member 33c which limits the forward movement of the screw 30 within a certain range.

Band heaters 36 are attached around the outer periphery of the plasticating cylinder 32. A feed port 37 which is upwardly open is provided at the rear end of the plasticating cylinder 32 which is mated with the retaining cylinder 33. A vent port 50 is provided through the upper portion of the cylinder forwardly in relation to the feed port 37. The vent port 50 is connected to a vacuum suction unit 50a and the feed port 37 is provided with an inert gas force feed unit 37a.

Attached to the front end of the screw 30 is a check valve 38 comprising a mushroom-shaped valve body having a cone-shaped tip. Inside the front end of the plasticating cylinder 32 where this check valve 38 is located, a recess is formed so as to correspond with the tip of the valve body, so that a flow passage communicating with the outflow passage 31 is formed around the check valve 38. Also, an annular valve seat 39 is fitted on the cylinder side opposed to the canted rear face of the check valve 38.

Depending upon the resin, the flow passage is so designed that a flow gap 31a of 1.0 mm to 1.5 mm may be formed between the check valve 38 and the valve seat 39 when the check valve 38 has a diameter of 36 mm and, at the same time, a sufficient flow passage may be formed between the check valve 38 and the wall of the recess. If the flow gap 31a measured 0.5 mm or less, heat generation within the plasticating cylinder would be too great, and when 2.0 mm or more, closing the valve would take too much time, easily resulting in incomplete prevention of the metered resin from flowing back.

The resin passage 13 is composed of capillary tubes 40 and has band heaters 41 around the outer periphery. It also has a required mixing member 42 within the upper portion. The capillary tubes 40 are provided at an angle with joints 40a and 40b across the inflow passage 25 of the injection cylinder 22 and the outflow passage 31 of the plasticating cylinder 32. When the plasticated resin passes through the resin passage 13, the temperatures throughout the resin will further be equalized.

The injection apparatus 11 and the plasticating apparatus 12 are linked integrally in a two-stage, upper and lower, configuration by fixing the retaining cylinder 33 on a support 28 installed on the injection cylinder 22 and are installed upon a platform 17 by placing and fixing the hydraulic cylinder 24 of the injection apparatus 11 on a slidable base block 16 linked via a nozzle touch cylinder 15 to a stationary platen 14 of a clamping device not shown. The tip of the nozzle 21 is in touch with a gate of an information recording disk mold 51 attached to the clamping device on the platform.

The mold 51 is composed of a fixed side part and a movable side part as is a conventional mold, with a plurality of disk molding cavities 52, 52 formed along the parting surface between those parts. The cavities 52, 52 are in communication with a mold gate through a hot runner 53 located within the fixed side part. In addition, a stamper is tensely provided on one face of each cavity 52.

A process for injection molding information recording disks utilizing the above described injection apparatus will now be described.

Hydraulic oil is supplied into the rear chamber side of the hydraulic cylinder 34 to advance the piston 34a and the rotation axis 33a together with the screw 30, thereby parting the canted rear surface from the valve seat 39 to open the valve. Almost simultaneously, the screw 30 is rotated with the rotation axis 33a by the revolution drive unit 35, and an inert gas such as nitrogen gas is forcibly fed into the cylinder through the feed port 37.

Pelletized polycarbonate is then supplied as a material resin through the feed port 37 into the plasticating cylinder 32. The material resin is melted and kneaded, that is, plasticated, by the heating by the band heaters 36 and the revolutions of the screw 30 under the inert gas atmosphere provided between the feed port 37 and vent port 50, while being forcibly fed progressively forward.

By means of the melting and kneading, the water contained in the material resin will be vaporized and the residual monomers will also be dissipated off the melted resin. These volatile gases are sucked at the vent port 50 and removed outward, not remaining in the portion of the melted resin which is forward in relation to the vent port 50. The melted and kneaded resin will then progressively reach the front end of the cylinder, to be fed out through the outflow passage 31 which is connected with the flow gap 31a between the check valve 38 and the valve seat 39 and into the resin passage 13.

In the resin passage 13, the subdivision and mixing of the resin will repeatedly take place, allowing the resin to flow toward the inflow passage 25 while being further kneaded. The resin will further flow into the front end of the injection cylinder 22 through the inflow passage 25, thereby applying pressure against the front end surface of the plunger 20 and moving the same backward, to be accumulated in and metered against the front end of the cylinder. Such metering will continue until the plunger 20 is set back to a predetermined location.

When the plunger 20 moves back to and stops at the location where the metering stops, the revolutions of the screw 30 will stop, temporarily discontinuing the plasticating of the resin. In addition, since the frontal area of the valve body of the check valve 38 is greater than the area of the canted rear surface, creating a difference in area, if the resin pressure during plasticating was greater at the plasticating cylinder side than at the front side of the valve body, the resin pressure acting against the front face of the valve body would be greater when the plasticating is not in progress. When the hydraulic oil acts against the front chamber of the hydraulic cylinder 34, therefore, the screw 30 will immediately move back to where the rear surface of a the valve body abuts the valve seat 39, unaffected by the resin pressure in the plasticating cylinder. As a result, the valve is closed within the front end of the plasticating cylinder 32, so that the flow of the resin will surely be cut off.

Besides, because the valve closing as described above is made by the backward movement of the screw, no extrusion of the resin at the front side of the valve body will occur and the location of the plunger 20 where the metering stops will be constant. As a result, a predetermined amount of resin will be metered at the front portion of the plunger 22.

When the plunger is moved forward with the check valve 38 closed, the metered resin in the injection cylinder will be injected through the nozzle 21 into the mold 51. The injection pressure applied by the plunger 20 will also act on the plasticating cylinder side through the resin remaining in the resin passage 13. Since the check valve 38 is closed, however, the resin will be prevented from flowing back to the plasticating cylinder side, so that the whole amount of metered resin will be filled from the nozzle 21 through hot runner 53 into both the cavities 52, 52 to be molded into thin disks and the transfer of the pits from the stamper will simultaneously be made.

Upon completion of the injection process confirmed, the screw 30 will be moved forward by the hydraulic cylinder 24 to open the valve, and will be rotated by the revolution drive unit 35 to start metering another portion of resin.

According to the molding process as described above, the plasticating of the resin and the volume of injected resin will be much more constant than when the plasticating is made also in the injection cylinder, so that error, if any, in the metering repeatedly made will be extremely small, enabling each time the injection and filling of the same amount of resin. It is therefore preferable to increase the number of cavities in a mold so as to produce a plurality of units simultaneously. This is preferable also in the sense that the metering will be more constant when a greater amount of resin is required for a batch of molding. By molding a plurality of units simultaneously, it will be able to produce more quality-constant information recording disks. It is therefore another characteristic of the present invention to produce a plurality of units simultaneously.

What is claimed is:

1. A process for injection molding rigid, transparent plastic objects comprising the steps of:

providing an unpelletized, unextruded, granular resin feedstock wherein said resin feedstock has not been subjected to predrying;

inserting said resin feedstock into a feed port of an injection machine having a vent port;

rotating a threaded plasticating screw in a plasticating cylinder fed by said feed port, said plasticating cylinder having the threaded plasticating screw inserted therein, wherein a check valve comprising a mushroom-shaped valve body having a cone-shaped tip is attached to the front end of said screw;

drawing said resin feedstock through said feed port into said plasticating cylinder of said injection machine;

heating said plasticating cylinder;

melting and kneading said resin feedstock through said heating and said rotating to produce molten resin, wherein an inert gas for preventing said resin feedstock from oxidizing during said melting and kneading is provided within said plasticating cylinder;

forcing said molten resin along said plasticating cylinder by said rotating;

vaporizing volatile components and impurities contained within said resin feedstock by said heating;

exhausting said volatile components and impurities out of said plasticating cylinder;

metering said molten resin by forcing a predetermined quantity of said molten resin from said plasticating cylinder into a front portion of an injection cylinder having a plunger for metering and injecting, wherein the check valve is closed by the backward movement of the screw to prevent the molten resin from flowing back to the plasticating cylinder side; and injecting said molten resin into a mold having at least one cavity for producing said molded plastic objects.

2. The process for injection molding according to claim 1 wherein said plasticating cylinder further comprises:

an in-line type threaded plasticating screw for said steps of inserting, rotating, drawing, heating, melting, kneading, forcing, vaporizing, and exhausting; and wherein said metering step further comprises:

forcing said molten resin from said plasticating cylinder into the front portion of said injection cylinder, wherein said predetermined quantity is determined by said molten resin forcing said plunger past a predetermined point.

3. The process for injection molding according to claim 1 wherein the inert gas atmosphere is provided within said plasticating cylinder between said feed port and said vent port, and said inert gas atmosphere persists during said vaporizing and said exhausting steps.

4. The process for injection molding according to claim 1 wherein said vent port is located between said feed port and an outflow passage proximate to a point wherein said granular resin feedstock is transformed to substantially molten resin and said impurities have been substantially exhausted through said vent port.

5. The process as in claim 1 wherein said step of extracting volatile materials extracts impurities such that said plastic object has transparency and birefringence sufficient to impart anisotropic properties for recording information.

6. The process as in claim 5 wherein said plastic objects are information recording disks and wherein said anisotropic properties are such that refraction of light through said information recording disk is of a continuous and predictable range whereby digital information may be recorded.

7. The process as in claim 3 wherein said step of providing an inert gas atmosphere prevents oxidation such that said plastic object has transparency and birefringence sufficient to impart anisotropic properties for recording information.

8. The process as in claim 7 wherein said plastic objects are information recording disks wherein said anisotropic properties are such that refraction of light through said information recording disk is of a continuous and predictable range whereby digital information may be recorded.

9. The process as in claim 1 wherein said granular feedstock is for producing said molded plastic object which are free from impurities such that said plastic object has transparency and birefringence sufficient to impart anisotropic properties for recording information.

10. The process as in claim 9 wherein said plastic objects are information recording disks wherein said anisotropic properties are such that refraction of light through said information recording disk is of a continuous and predictable range whereby digital information may be recorded.

11. The process as in claim 1 wherein said plastic molded object is sufficiently free of impurities such that said plastic object has anisotropic properties sufficient for recording magnetic information.

12. The process as in claim 11 wherein said plastic objects are information recording disks wherein said disk is capable of receiving magnetic particles having anisotropic properties such that said information recording disk is of a continuous and predictable range whereby digital information may be recorded.

13. The injection molding process according to claim 1 wherein said melting is a first time melting of said resin feedstock since polymerization.

14. The injection molding process according to claim 1 wherein said molded plastic object has a thin circular, planar shape.

15. The injection molding process according to claim 1 wherein said molded plastic object is an information recording disk.

16. The injection molding process according to claim 15 wherein said process molds said information recording disk has a thickness between 0.6 mm and 1.2 mm.

17. The injection molding process according to claim 1 wherein said step of inserting said resin feedstock is gravity fed whereby said granular feedstock is drawn into said plasticating cylinder in a free-flowing manner by gravitational force without an external feed screw.

18. The process for injection molding according to claim 1 wherein said granular feedstock is feedstock having a particle size between 0.5 mm and 0.1 mm.

19. The process for injection molding according to claim 1 wherein said granular feedstock has a water content between 0.1% and saturation.

20. The process for injection molding according to claim 1 wherein said at least one mold further comprises a plurality of molds and said injecting comprises simultaneous injecting into said plurality of molds.

21. The process for injection molding according to claim 1 wherein the resin feedstock comprises polycarbonate.

* * * * *